US009974001B2

(12) United States Patent
Dearlove et al.

(10) Patent No.: US 9,974,001 B2
(45) Date of Patent: May 15, 2018

(54) AD HOC NETWORK WITH UNIDIRECTIONAL LINK

(71) Applicant: BAE Systems plc, London (GB)

(72) Inventors: Christopher Mark Dearlove, Chelmsford (GB); Alan Manuel Cullen, Chelmsford (GB); Peter Noble Hudson, Chelmsford (GB); Rania Hamdi Eissa, Chelmsford (GB)

(73) Assignee: BAE Systems plc, London (GB)

( * ) Notice: Subject to any disclaimer, the term of this patent is extended or adjusted under 35 U.S.C. 154(b) by 0 days. days.

(21) Appl. No.: 15/302,594

(22) PCT Filed: Apr. 1, 2015

(86) PCT No.: PCT/GB2015/051021
§ 371 (c)(1),
(2) Date: Oct. 7, 2016

(87) PCT Pub. No.: WO2015/155510
PCT Pub. Date: Oct. 15, 2015

(65) Prior Publication Data
US 2017/0026898 A1 Jan. 26, 2017

(30) Foreign Application Priority Data

Apr. 7, 2014 (GB) .................................. 1406289.7
Apr. 8, 2014 (EP) .................................... 14250070

(51) Int. Cl.
*H04W 40/24* (2009.01)
*H04W 40/30* (2009.01)
(Continued)

(52) U.S. Cl.
CPC ......... *H04W 40/246* (2013.01); *B64C 39/024* (2013.01); *G05D 1/104* (2013.01);
(Continued)

(58) Field of Classification Search
None
See application file for complete search history.

(56) References Cited

U.S. PATENT DOCUMENTS

| 6,580,981 B1 | 6/2003 | Masood et al. |
| 7,505,751 B1 | 3/2009 | Backes |

(Continued)

FOREIGN PATENT DOCUMENTS

| CN | 101083700 A1 | 12/2007 |
| EP | 1368941 A2 | 12/2003 |

(Continued)

OTHER PUBLICATIONS

"The Optimized Link State Routing Protocol Version 2; Draft-IETF-Manet-OLSRV2-18." IETF Standard-Working-Draft, Internet Engineering Task Force, Mar. 18, 2013.*

(Continued)

Primary Examiner — Jamal Javaid
Assistant Examiner — Rose Clark
(74) Attorney, Agent, or Firm — Maine Cernota & Rardin

(57) ABSTRACT

A method and apparatus for use in an ad hoc network, comprising: a node transmitting an extended allowable hold time value to a further node; the node changing its transmission behavior such that the further node stops receiving transmission from the node for an extended period, for example by pausing transmission at least in the direction of the further node; and the further node treating the link to the node as intact during the extended allowable hold time. The transmitting of the extended allowable hold time value may be performed earlier than a next routine transmission of routine allowable hold time value would have been sent. The method may further comprise the node being instructed to maintain topology information for an extended time.

12 Claims, 5 Drawing Sheets

(51) Int. Cl.
*B64C 39/02* (2006.01)
*G05D 1/10* (2006.01)
*H04W 84/18* (2009.01)

(52) U.S. Cl.
CPC ....... *H04W 40/30* (2013.01); *B64C 2201/122* (2013.01); *H04W 84/18* (2013.01)

(56) References Cited

U.S. PATENT DOCUMENTS

| | | | | |
|---|---|---|---|---|
| 2003/0179742 | A1* | 9/2003 | Ogier | H04L 1/1614 370/351 |
| 2004/0076164 | A1* | 4/2004 | Vanderveen | H04L 45/28 370/400 |
| 2007/0019771 | A1 | 1/2007 | Ambuehl | |
| 2008/0056196 | A1 | 3/2008 | Ito | |
| 2008/0298304 | A1* | 12/2008 | Yagyu | H04L 45/26 370/328 |
| 2009/0003366 | A1* | 1/2009 | Chen | H04L 45/123 370/406 |
| 2013/0188513 | A1 | 7/2013 | Vasseur et al. | |

FOREIGN PATENT DOCUMENTS

| | | |
|---|---|---|
| GB | 2500648 A1 | 3/2012 |
| WO | 99/14898 A1 | 3/1999 |

OTHER PUBLICATIONS

International Search Report and Written Opinion of PCT Appl No. PCT/GB2015/051019 dated Jun. 3, 2015, 9 pages.
Great Britain Search Report for Appl No. GB1406288.9 dated Jul. 31, 2014, 4 pages.
European Search Report for Appl No. EP14250071.9 dated Sep. 30, 2014, 5 pages.
Burgess J et al: "MaxProp: Routing for Vehicle-Based Disruption-Tolerant Networks", INFOCOM 2006. 25th IEEE International Conference on Computer Communications Proceedings, IEEE, Piscataway, NJ, Apr. 1, 2006 (Apr. 1, 2006), pp. 1-11 , XP031072268, DOI: 10.1109/INFOCOM.2006.228 ISBN: 978-1-4244-0221-2.
Lindgren Sics a Doria Consultant E Davies Folly Consulting & Grasic Lulea University of Technology A: "Probabilistic Routing Protocol for Intermittently Connected Networks; draft-irtf-dtnrg-prophet-10. txt", Draft-IRTF-DTNRG-Prophet-10.Txt, Internet Engineering Task Force, IETF; Standardworkingdraft, Internet Society (ISOC) 4, Rue Des Falaises CH-1205 Geneva, Switzerland, May 22, 2012 (May 22, 2012), pp. 1-122, XP015082967, [retrieved on May 22, 2012].
International Preliminary Report on Patentability of PCT Appl No. PCT/GB2015/051019, dated Jul. 21, 2016, 8 pages.
Maurice J Khabbaz et al: "Delay-Aware Data Delivery in Vehicular Intermittently Connected Networks", vol. 61, No. 3, Mar. 1, 2013 (Mar. 1, 2013), pp. 1134-1143, XP011504967.
Herberg, Ulrich "Delay Tolerant Networking with OLSRv2", 2011 IFIP Ninth International Conference on Embedded and Ubiquitous Computing, IEEE Computer Society, pp. 144-149, 978-0-7695-4552-3/11, 2011, DOI 10.1109/EUC.2011.27.
Thomas Heide Clausen, Ulrich Herberg, "Delay Tloerant Routing with OLSRv2", [Research Report] RR-7662, INRIA, 2011, <inria-00611183>, submitted Oct. 25, 2011, https://hal.inria.fr/inria-00611183.
International Search Report and Written Opinion of PCT Appl No. PCT/GB2015/051021 dated Jun. 19, 2015, 13 pages.
Great Britain Search Report for Appl No. GB1406289.7 dated Jul. 28, 2014, 3 pages.
European Search Report for Appl No. EP14250070.1 dated Sep. 8, 2014, 10 pages.
George Adam et al: "Performance evaluation of routing protocols for multimedia transmission over mobile ad hoc networks", Wireless and Mobile Networking Conference (WMNC), 2011 4th Joint IFIP, IEEE, Oct. 26, 2011 (Oct. 26, 2011), pp. 1-6, XP032072158, DOI: 10.1109/WMNC.2011.6097250, ISBN: 978-1-4577-1192-3.
Deepeshman Shrestha et al: "A New Routing Protocol in Ad Hoc Networks with Unidirectional Links", Jan. 1, 2005 (Jan. 1, 2005), Distributed Computing—IWDC 2005 Lecture Notes in Computer Science; LNCS, Springer, Berlin, DE, pp. 287-292, XP019026575, ISBN: 978-3-540-30959-8 3.2 Utilizing Unidirectional Links.
Rogge Fraunhofer Fkie E Baccelli Inria H: "Packet Sequence Number based directional airtime metric for OLSRv2; draft-rogge-baccelli-olsrv2-ett-metric-03. txt", Packet Sequence Number Based Directional Airtime Metric for OLSRV2; Draft-Rogge-Baccelli-OLSRV2-Ett-Metric-03. Txt, Internet Engineering Task Force, IETF; Standardworkingdraft, Internet Society (ISOC) 4, Rue Des Falaises CH-1205 Geneva, Switzerland, Sep. 18, 2013 (Sep. 18, 2013).
Megat Zuhairi et al: "A simulation study on the impact of mobility models on routing protocol performance with unidirectional link presence", Information Networking (ICOIN), 2011 International Conference on, IEEE, Jan. 26, 2011 (Jan. 26, 2011), pp. 335-340, XP031922530, DOI: 10.1109/ICOIN.2011.5723203 ISBN: 978-1-61284-661-3.
Hiyama M; Investigating the Effect of HELLO Validity Time of OLSR in a MANET Testbed, 2013 Eighth International Conference on Broadband and Wireless Computing, Communication and Applications (BWCCA 2013); Oct. 28-30, 2013; p. 296-301.
Suganthi P; Impact of Malicious Nodes under Different Route Refresh Intervals in Ad Hoc Network, 2013 The Institution of Engineering and Technology; American Journal of Applied Sciences Jan. 28, 2013; vol. 9; p. 18-23.
International Preliminary Report on Patentability of PCT Appl No. PCT/GB2015/051021, dated Oct. 12, 2016, 8 pages.

* cited by examiner

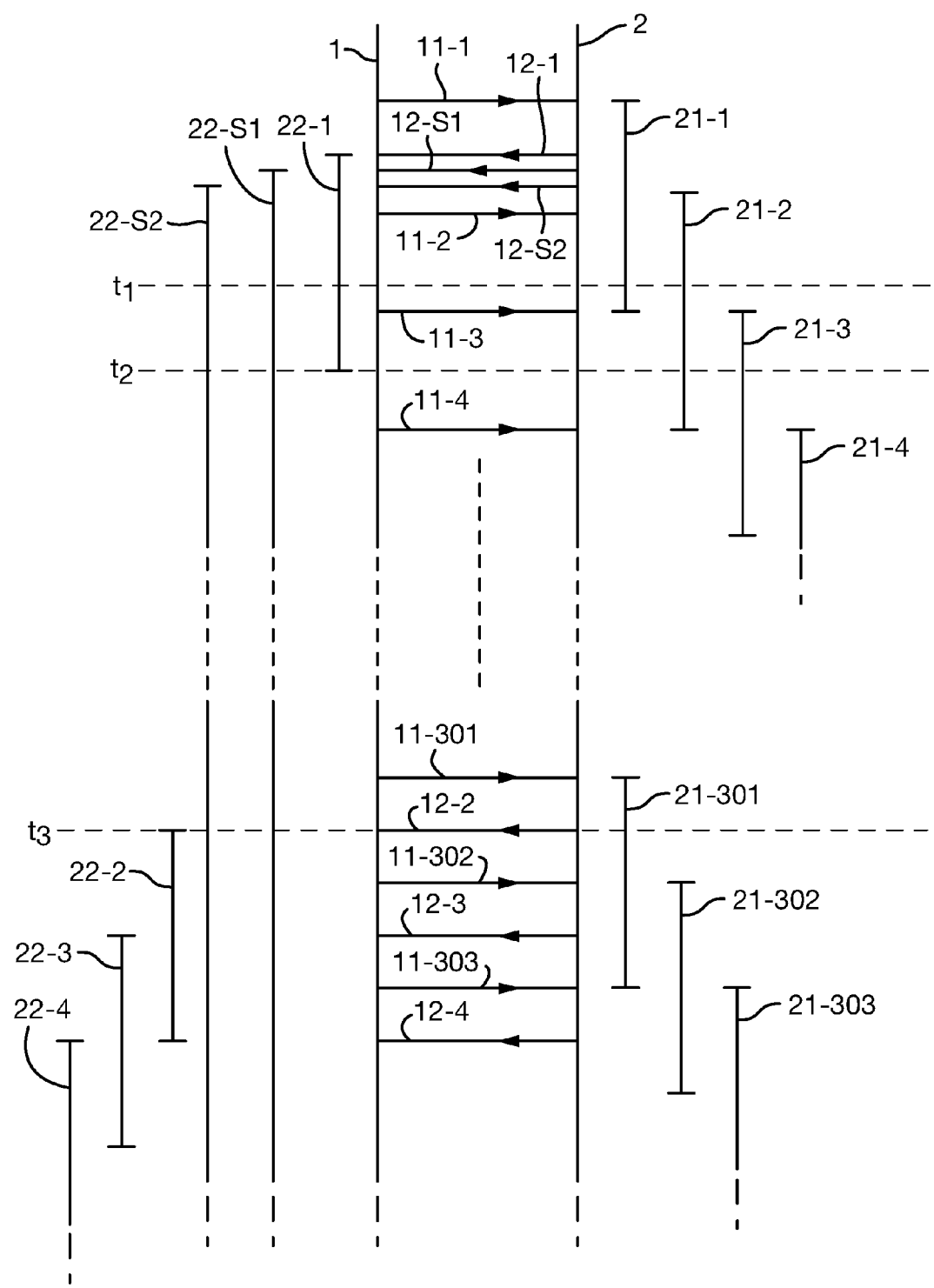

AD HOC NETWORK WITH UNIDIRECTIONAL LINK

RELATED APPLICATIONS

This application is a national phase application filed under 35 USC § 371 of PCT Application No. PCT/GB2015/051021 with an International filing date of Apr. 1, 2015, which claims priority of GB Patent Application GB 1406289.7 filed Apr. 7, 2014 and EP Patent Application EP14250070.1 filed Apr. 8, 2014. Each of these applications is herein incorporated by reference in its entirety for all purposes.

FIELD OF THE INVENTION

The present invention relates to ad hoc communications networks. The present invention relates in particular to, but is not limited to, ad hoc wireless networks, including in particular, but not limited to, ad hoc wireless networks in which some or all of the nodes are vehicles, for example unmanned air vehicles (UAVs).

BACKGROUND

Various types of ad hoc networks are known, for example ones based on "proactive routing protocols", which includes protocols that are known as "link state routing protocols". One known link state routing protocol for ad hoc networks is the Optimised Link State Routing Protocol version 2 (OLSRv2) [RFC 7181]. OLSRv2 is an example of a protocol that employs only bidirectional links between nodes.

One known use of ad hoc networks is to provide a wireless communications network where some or all of the nodes are vehicles, for example unmanned air vehicles (UAVs).

Separate to consideration of ad hoc networks, it is known to sometimes apply emission control rules to UAVs and other vehicles, for example if a UAV is undertaking a military mission and it becomes desired to restrict wireless emissions from the UAV in a specific direction or range of directions.

SUMMARY OF THE INVENTION

The present inventor has realised it would be desirable to provide, in an ad hoc network whose protocol normally requires or only uses bidirectional links (for example OLSRv2), a capability to temporarily in effect use a link as a unidirectional link. The present inventor has further realised that preferably this would be done in a manner that avoided or alleviated loss of capabilities and performance otherwise provided in the network by virtue of its underlying bidirectional operation.

The present inventor has also realised that it would be desirable to provide such a capability as part of an emission control, for example for UAVs needing to restrict wireless emissions in a specific direction or range of directions.

In a first aspect, the invention provides a method in an ad hoc network comprising a plurality of nodes, the method comprising: i) a node transmitting a first neighbour discovery message, comprising a first allowable hold time value indicating how long other nodes should be prepared to wait for a further neighbour discovery message whilst still considering that a link to and from the node is intact, to a further node; and ii) the further node transmitting a second neighbour discovery message, comprising a second allowable hold time value indicating how long other nodes should be prepared to wait for a further neighbour discovery message whilst still considering that a link to and from the further node is intact, to the node; a bidirectional link between the node and the further node thereby being provided by the steps i) and ii); iii) the node transmitting a third neighbour discovery message, comprising a third allowable hold time value indicating how long other nodes should be prepared to wait for a further neighbour discovery message whilst still considering that a link to and from the node is intact, to the further node, the third allowable hold time being an extended allowable hold time compared to the first allowable hold time; iv) the further node transmitting a fourth neighbour discovery message, comprising a fourth allowable hold time value indicating how long other nodes should be prepared to wait for a further neighbour discovery message whilst still considering that a link to and from the further node is intact, to the node, the fourth allowable hold time value being the same as, or less than, the second allowable hold time; and v) the node changing its transmission behaviour such that the further node stops receiving transmission from the node for an extended period; a unidirectional link from the further node to the node thereby being provided by the steps iii), iv) and v).

The node changing its transmission behaviour may comprise the node pausing transmission at least in the direction of the further node.

The extended allowable hold time may relate to timing receipt of future hello messages.

The transmitting of the extended allowable hold time value may be performed earlier than a next routine transmission of routine allowable hold time value would have been sent.

The method may further comprise the node being instructed to maintain topology information for an extended time.

The node may be instructed to maintain topology information for an extended time by use of one or more special topology messages advertising all possible destinations as local attached sub-networks or networks.

A link metric value for the link between the node and the further node may be reset to a new value that indicates the link as a now less desirable route.

The new link metric value may be of a value that any overall routes that involve the link will be ones of last resort.

The new link metric value may be higher than was the case before the value was reset.

The method may be performed responsive to a threat located at a position relative to the positions of the node and the further node that means it is not desired to transmit in a direction from the node to the further node but it is desired or acceptable to transmit in a direction from the further node to the node.

The ad hoc network may be operated under the OLSRv2 protocol.

Some or all of the nodes may be unmanned vehicles.

Some or all of the nodes may be unmanned air vehicles.

In a further aspect, the invention provides apparatus for use in an ad hoc network, the ad hoc network comprising a plurality of nodes, the apparatus comprising: i) means for a node to transmit a first neighbour discovery message, comprising a first allowable hold time value indicating how long other nodes should be prepared to wait for a further neighbour discovery message whilst still considering that a link to and from the node is intact, to a further node; and ii) means for the further node to transmit a second neighbour discovery message, comprising a second allowable hold time value indicating how long other nodes should be prepared to wait for a further neighbour discovery message whilst still considering that a link to and from the further node is intact, to the node; the means i) and ii) being for providing thereby a bidirectional link between the node and the further node; iii) means for the node to transmit a third neighbour discovery message, comprising a third allowable hold time value indicating how long other nodes should be prepared to wait for a further neighbour discovery message whilst still considering that a link to and from the node is intact, to the further node, the third allowable hold time being an extended allowable hold time compared to the first allowable hold time; iv) means for the further node to transmit a fourth neighbour discovery message, comprising a fourth allowable hold time value indicating how long other nodes should be prepared to wait for a further neighbour discovery message whilst still considering that a link to and from the further node is intact, to the node, the fourth allowable hold time value being the same as, or less than, the second allowable hold time; and v) means for the node to change its transmission behaviour such that the further node is stopped receiving transmission from the node for an extended period; the means iii), iv) and v) being for providing thereby a unidirectional link from the further node to the node.

In a further aspect, the invention provides a program or plurality of programs arranged such that when executed by a computer system or one or more processors it/they cause the computer system or the one or more processors to operate in accordance with the method of any of the above aspects.

In a further aspect, the invention provides a machine readable storage medium storing a program or at least one of the plurality of programs according to any of the above aspects.

In a further aspect, the invention provides a method in an ad hoc network comprising a plurality of nodes, the method comprising: a node transmitting an extended allowable hold time value to a further node; the node changing its transmission behaviour such that the further node stops receiving transmission from the node for an extended period; and the further node treating the link to the node as intact during the extended allowable hold time.

In a further aspect, the invention provides apparatus for use in an ad hoc network, the ad hoc network comprising a plurality of nodes, the apparatus comprising: means for a node to transmit an extended allowable hold time value to a further node; means for the node to change its transmission behaviour such that the further node stops receiving transmission from the node for an extended period; and means for the further node to treat the link to the node as intact during the extended allowable hold time.

BRIEF DESCRIPTION OF THE DRAWINGS

FIG. 5 is a message sequence chart showing an embodiment that addresses the scenario shown in FIG. 3 and that avoids the outcome that occurs when the invention is not implemented.

DETAILED DESCRIPTION

Figure 1:
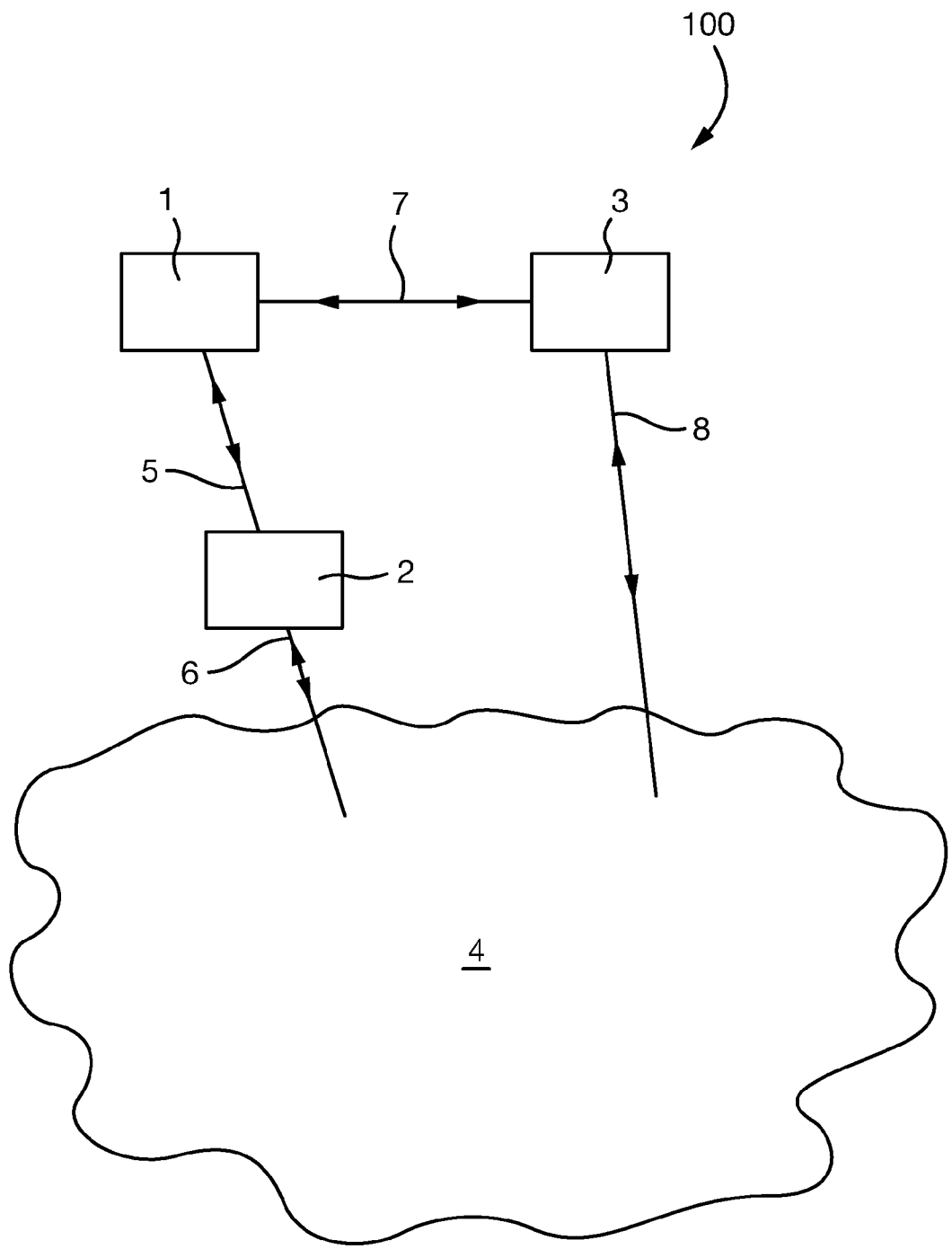
FIG. 1 is a schematic illustration of an ad hoc network.

FIG. 1 is a schematic illustration of an ad hoc wireless network 100 (hereinafter referred to as a network 100) in which a first embodiment may be implemented. In this embodiment the network 100 comprises a plurality of nodes, of which some are in the form of UAVs. Other nodes may be in other forms, for example manned aircraft and/or ground stations.

In this embodiment the network 100 operates according to the OLSRv2 protocol, in conventional manner, except where stated otherwise below.

By way of example, three UAV nodes are shown in FIG. 1, namely a first node 1, a second node 2, and a third node 3. Also shown schematically in FIG. 1 is a sub-network 4 of the network 100. The sub-network comprises a plurality of further nodes that are inter-connected in any suitable manner and according to their current situations.

The nodes of the network 100 are coupled on an ad hoc basis by wireless links established between respective nodes. Some nodes may be coupled to only one other node, whereas other nodes may be coupled to plural other nodes. Some nodes may be isolated, especially if they have no need to communicate. FIG. 1 shows a current situation where in conventional manner all the links are operated as bidirectional links in conventional manner.

In the exemplary current situation shown in FIG. 1, a first link 5 is provided between the first node 1 and the second node 2, a second link 6 is provided between the second node 2 and a node (not shown) in the sub-network 4, a third link 7 is provided between the first node 1 and the third node 3, and a fourth link 8 is provided between the third node 3 and a node (not shown) in the sub-network 4. In practice any of the nodes shown in FIG. 1 may be coupled by further bidirectional links to further nodes in addition to those shown in the Figure, including further nodes in the sub-network 4. However, for convenience, and clarity of the drawing, only the above mentioned links will be considered in the following description of this embodiment.

Figure 2:
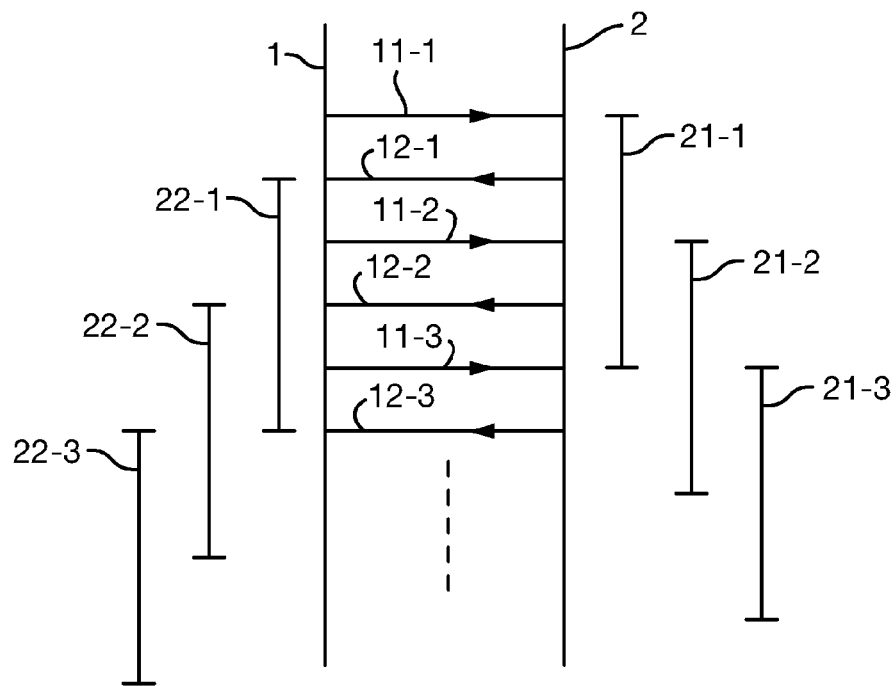
FIG. 2 is a message sequence chart showing certain messages sent between a first node and a second node during routine operation of the network of FIG. 1.

FIG. 2 is a message sequence chart showing certain messages sent between the first node 1 and the second node 2 during routine operation of the network 100, i.e. as shown in FIG. 1 where the link between these nodes, i.e. the first link 5, is operating in conventional manner as a bidirectional link.

The message sequence chart of FIG. 2 shows an ongoing situation, in which messages have already been passed between the two nodes during and since their establishment of the link between them in an ad hoc basis in the network 100 in conventional manner. However, for convenience, various messages etc. to be described as the ongoing operation of the link continues will now be called a "first" message, a "second" message etc. to indicate the relative order of their transmissions, even though for example the message described as a first message is not the first message in an absolute sense.

Referring to FIG. 2, the first node 1 transmits a first neighbour discovery message, which in this embodiment may be termed its first "hello plus hold time" message 11-1, which in this example is received by the second node 2. In the protocol of this example, i.e. OLSRv2, the hello plus hold time messages, i.e. hello/neighbour discovery messages that include a hold time parameter value, carry out the neighbour discovery and link symmetry recognition. The "hello" part of the message 11-1 serves to indicate the presence and availability of the first node 1. The "hold time" is a time duration value set by the first node 1, and indicates to other nodes, in this example the second node 2, how long the second node 2 should be prepared to wait for a further hello plus hold time message whilst still considering that the first node 1 is present and available i.e. whilst still considering that the first link 5 is intact. Put differently, after a length of time equal to the hold time duration, the second node 2 should consider the first node 1 is no longer present and available if it has not received any further hello plus hold time messages, i.e. should consider the first link 5 is no longer intact. The hold time 21-1 included in the first hello plus hold time message 11-1 is shown schematically in FIG. 2.

In corresponding fashion the second node 2 transmits its first neighbour discovery message, which in this embodiment may be termed its first hello plus hold time message 12-1, which is received in this example by the first node 1. The functions and characteristics of the hello part of the message 12-1 and the hold time correspond to those described above for the first node's first hello plus hold time message 11-1. The hold time value set by the second node 2 and included in the second hello plus hold time message 12-1 is indicated by reference numeral 22-1 in FIG. 2. Thus, now both the first node 1 and the second node 2 have gained knowledge of the presence and availability of the other node, i.e. the first link 5 is now an established bidirectional link, and furthermore both the first node 1 and the second node 2 have gained knowledge of how long they should consider the first link 5 remains intact in the absence of receiving a further hello plus hold time message.

Thereafter, provided both the first node 1 and the second node 2 remain present and available to each other (and as particularly considered by the present inventor as a contrast to later scenarios described below), the first node 1 and the second node 2 continue to transmit new neighbour discovery messages, which in this embodiment may be termed new hello plus hold time messages within a time frame that is within the relevant hold time window, thereby maintaining the bidirectional link 5 between them. (More generally in this embodiment, and in the other embodiments described below, neighbour discovery messages may be termed hello plus hold time messages.) Typically, new messages will be sent out at rate that gives time for multiple messages to be sent within the time frame of the hold time, to allow redundancy, i.e. to allow occasional failure of a hello plus hold time message to be received by a node without the link being considered as no longer intact. For example, the hold time may be set at a given multiple, for example a multiple of two, times the time between consecutive transmissions of the hello plus hold time messages. Another preferred value is a multiple of three. Referring again to FIG. 2, further messages sent during the above described ongoing steady operation in which the first link 5 remains intact are shown, as follows.

The first node 1 transmits its second hello plus hold time message 11-2 which contains a refreshed hold time 21-2 and which is received by the second node 2. Note that because the second node 2 receives this message 11-2 before the hold time 21-1 has expired, the second node 2 considers the first link 5 remains intact for the refreshed hold time.

The second node 2 transmits its second hello plus hold time message 12-2 which contains a refreshed hold time 22-2 and which is received by the first node 1. Note that because the first node 1 receives this message 12-2 before the hold time 22-1 has expired, the first node 1 considers the first link 5 remains intact for the refreshed hold time.

The first node 1 transmits its third hello plus hold time message 11-3 which contains a refreshed hold time 21-3 and which is received by the second node 2. Note that because the second node 2 receives this message 11-3 before the hold time 21-2 has expired, the second node 2 considers the first link 5 remains intact.

The second node 2 transmits its third hello plus hold time message 12-3 which contains a refreshed hold time 22-3 and which is received by the first node 1. Note that because the first node 1 receives this message 12-3 before the hold time 22-2 has expired, the first node 1 considers the first link 5 remains intact.

In this example all of the hold times of a given node in the above routine operation stage (where only bidirectional links are desired) are equal (for example, equal to 2 seconds), however this need not be the case in other examples. Furthermore, in this example the hold times of the first node are equal to the hold times of the second node, however this also need not be the case in other examples.

The above process continues as described until transmissions from one of the nodes are no longer received by the other node within the relevant hold time and hence the link is no longer considered as intact. The present inventor has realised that it would be desirable to alter this outcome for the special case where it would be desirable to use the link in effect as a unidirectional link, whist remaining within the operating protocol that is intended only for bidirectional links. This will now be described in further detail.

Figure 3:
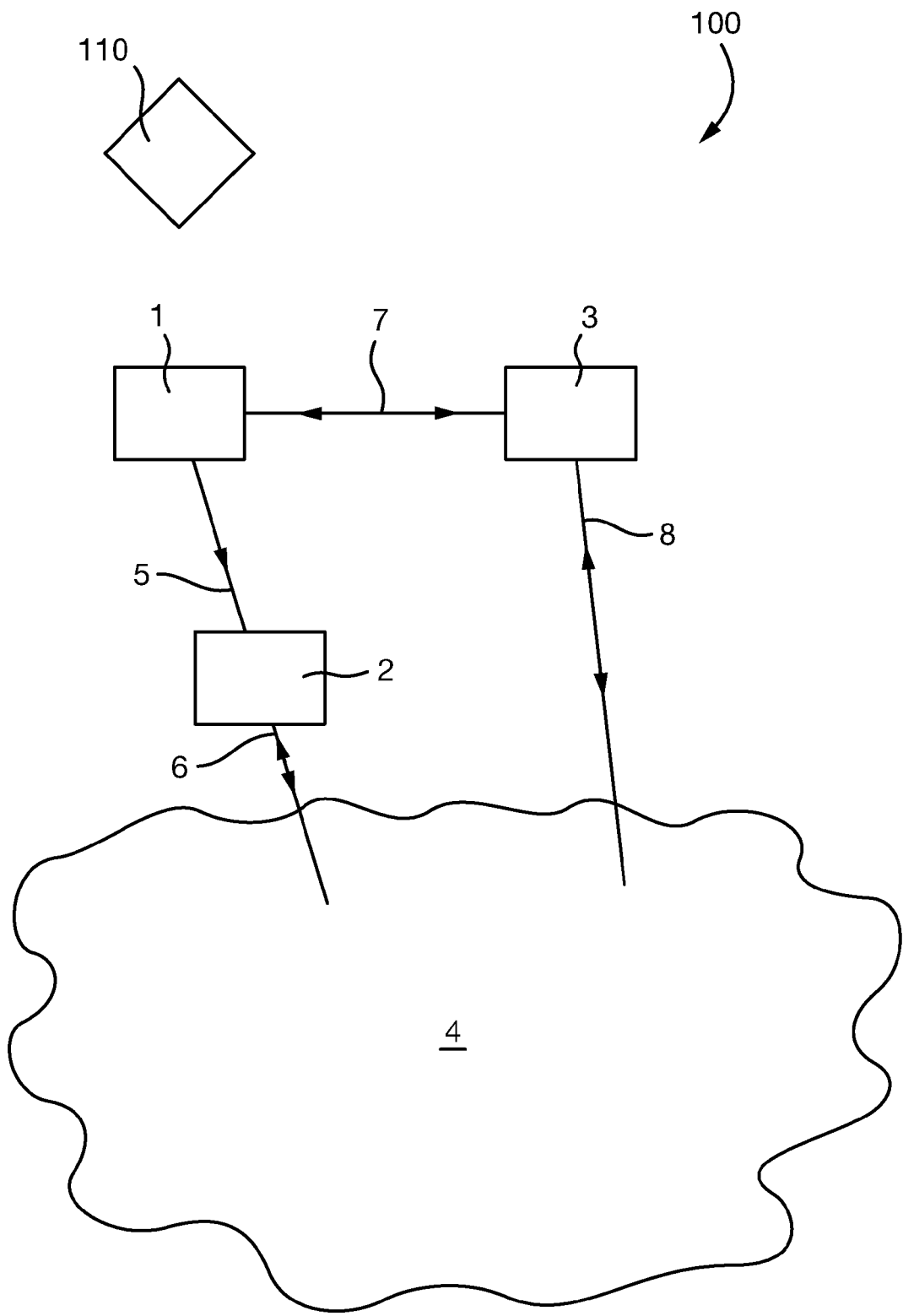
FIG. 3 is a schematic representation of a scenario applied to the network of FIG. 1.

Let us now consider a scenario shown by way of example in FIG. 3. The network 100 of FIG. 3 is the same network 100 as was shown in FIG. 1, and comprises the same elements as previously described. In the scenario shown in FIG. 3, a threat 110 is present, and it is required to cease transmissions in the direction of the threat. In the present example scenario the threat 110 is positioned relative to the nodes such that in the above described network 100 it is desired or required to temporarily cease transmission from the second node 2 to the first node 1, although it is still desired or acceptable to transmit from the first node 1 to the second node 2. This condition is represented schematically in FIG. 3 by showing the first link 5 as a unidirectional link.

Figure 4:
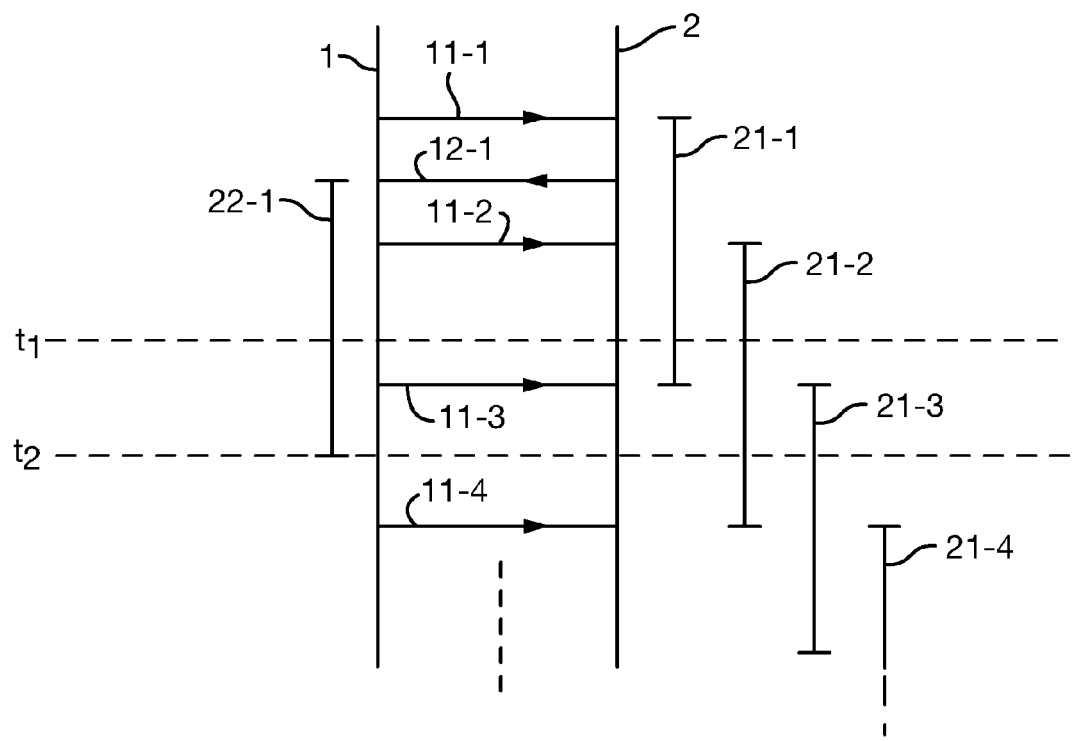
FIG. 4 is a message sequence chart showing what would happen in the scenario of FIG. 3 if the invention were not implemented.

For comparison, we shall first refer to FIG. 4 which is a message sequence chart showing what would happen in the above described scenario of FIG. 3 if the invention were not implemented. As before, for convenience, various messages etc. to be described as the ongoing operation of the link continues will now be called a "first" message, a "second" message etc. to indicate the relative order of their transmissions, even though for example the message described as a first message is not the first message in an absolute sense.

Referring to FIG. 4, initially consider it has not yet been decided to react to the threat 110. The first node 1 transmits its first "hello plus hold time" message 11-1, which in this example is received by the second node 2.

Since it has not yet been decided to react to the threat 110, in corresponding fashion the second node 2 transmits its first hello plus hold time message 12-1, which is received in this example by the first node 1.

Let us then consider that immediately after sending its first hello plus hold time message 12-1, the second node 2 determines that it should shortly temporarily cease transmissions, at least in one or more directions that include the direction of the threat 110 and also in this example consequently the direction of the first node 1. (This determination may be by any suitable means, for example the second node 2 may determine this itself by detecting the threat 110, or may have pre-programmed information regarding the threat's position in e.g. a mission plan, or may be informed of the information during flight by communication received over the network 4.) Hence, going forward, during the period of ceasing transmissions due to the threat 110, the second node will no longer transmit further hello plus hold time messages (or at least not any in a direction that will mean the first node 1 will receive them).

The first node 1 transmits its second hello plus hold time message 11-2 which contains a refreshed hold time 21-2 and which is received by the second node 2. Because the second node 2 receives this message 11-2 before the hold time 21-1 has expired, the second node 2 considers the first link 5 remains intact.

As described above, in this scenario, at a time $t_1$ shown schematically in FIG. 4, due to the threat 110 there has been no second hello plus hold time message 12-2 received by the first node 1. However, as the hold time 22-1 has not yet expired, the first node 1 nevertheless considers the first link 5 remains intact.

The first node 1 transmits its third hello plus hold time message 11-3 which contains a refreshed hold time 21-3 and which is received by the second node 2. Because the second node 2 receives this message 11-3 before the hold time 21-2 has expired, the second node 2 considers the first link 5 remains intact.

Now let us consider a time $t_2$ shown schematically in FIG. 4 which is the time at which the hold time 22-1 (earlier sent to the first node 1 by the second node 2 in the second node's first message 12-1) expires. Since no further hello plus hold time messages have been received by the first node 1 from the second node 2 before this expiry of the hold time 22-1, the first node 1 now considers the first link 5 is no longer intact.

The first node 1 transmits its fourth hello plus hold time message 11-4 which contains a refreshed hold time 21-4 and which is received by the second node 2. Because the second node 2 receives this message 11-4 before the hold time 21-3 has expired, the second node 2 considers the first link 5 remains intact.

Thus in this scenario, if the invention is not implemented, the first node 1 considers the first link 5 to be no longer intact, whereas the second node 2 considers the first link 5 is intact. However, as noted by the inventor, this is a somewhat unhelpful situation, because the node (here the first node 1) that is allowed to use the link relative to the threat, i.e. the node that is still permitted threat-wise to transmit to the other node, is the one (the first node 1) that considers the link is no longer intact, whereas the node (here the second node 2) that is not allowed to use the link in view of the threat, i.e. the node that is not permitted threat-wise to transmit to the other node, is the one (the second node 2) that considers the link is intact.

FIG. 5 is a message sequence chart showing an embodiment that addresses the same threat scenario that is shown in FIG. 3, and that avoids the outcome that occurs when the invention is not implemented (which outcome was described immediately above with reference to FIG. 4). As before, for convenience, various messages etc. to be described as the ongoing operation of the link continues will now be called a "first" message, a "second" message etc. to indicate the relative order of their transmissions, even though for example the message described as a first message is not the first message in an absolute sense.

Referring to FIG. 4, initially consider it has not yet been decided to react to the threat 110. The first node 1 transmits its first "hello plus hold time" message 11-1, which in this example is received by the second node 2.

Since it has not yet been decided to react to the threat 110, in corresponding fashion the second node 2 transmits its first hello plus hold time message 12-1, which is received in this example by the first node 1.

Let us then consider that immediately after sending its first hello plus hold time message 12-1, the second node 2 determines that it should shortly temporarily cease transmissions, at least in one or more directions that include the direction of the threat 110 and also in this example consequently the direction of the first node 1. (This determination may be by any suitable means, for example the second node 2 may determine this itself by detecting the threat 110, or may have pre-programmed information regarding the threat's position in e.g. a mission plan, or may be informed if the information during flight by communication received over the network 4.) Hence, in due course, going forward, during the period of ceasing transmissions due to the threat 110, the second node will no longer transmit further hello plus hold time messages (or at least not any in a direction that will mean the first node 1 will receive them).

In this embodiment, in preparation for ceasing transmission, the second node 2 then transmits one or more (in this embodiment two) special hello plus hold time messages in relatively quick succession. First, the second node 2 transmits a first special hello plus hold time message 12-$s1$ which contains a special refreshed hold time 22-$s1$ and which is received by the first node 1. The value of the hold time 22-$s1$ is a special value that is much longer than any values that would typically be used for normal operation of the network 100. For example, in the present example where hello messages are routinely being transmitted every 2 seconds by a node, and where the typical hold time may be 4 seconds, the special value hold time 22-$s1$ is set at 1 hour.

Preferably, for redundancy purposes, i.e. as backup in case the first one was not received at the first node 1 for any reason, one or more additional special hello plus hold time messages are transmitted by the second node 2 before ceasing transmission. In this embodiment just one further such special message is transmitted by the second node 2, namely a second special hello plus hold time message 12-$s2$, which contains a special refreshed hold time 22-$s2$ and which is received by the first node 1. In this embodiment the value of this second special hold time 22-$s2$ is the same (i.e. 1 hour) as that of the first special hold time 22-$s1$, however that need not be the case in other embodiments. Thereafter, the second node 2 implements its temporary ceasing of transmission, at least in the direction of the first node 1, i.e. including not sending any further hello plus hold time messages during its temporary transmission ceasing period.

The first node 1 transmits its second hello plus hold time message 11-2 which contains a refreshed hold time 21-2 and which is received by the second node 2. Because the second node 2 receives this message 11-2 before the hold time 21-1 has expired, the second node 2 considers the first link 5 remains intact.

As described above, in this scenario, at a time $t_1$ shown schematically in FIG. 4, due to the threat 110 there has been no second routine hello plus hold time message received by the first node 1. However, as the special hold time 22-$s2$ has not yet expired, the first node 1 nevertheless considers the first link 5 remains intact (as will be understood from the earlier FIG. 4 account, this would anyway have been the case at time $t_1$ even if there had been no special hold times set, since the earlier routine hold time 22-1 has also not yet expired).

The first node 1 transmits its third hello plus hold time message 11-3 which contains a refreshed hold time 21-3 and which is received by the second node 2. Because the second node 2 receives this message 11-3 before the hold time 21-2 has expired, the second node 2 considers the first link 5 remains intact.

Now let us consider again the time $t_2$ shown schematically in FIG. 5, which is the time at which the first routine hold time 22-1 (earlier sent to the first node 1 by the second node 2 in the second node's first message 12-1) expires. In this FIG. 5 embodiment, in contrast to the FIG. 4 situation described earlier above, because the first routine hold time 22-1 is no longer the current hold time threshold, since it has been superseded by the latest one received, which is the second special hold time 22-s2, the first node 1 considers the first link 5 remains intact.

The first node 1 transmits its fourth hello plus hold time message 11-4 which contains a refreshed hold time 21-4 and which is received by the second node 2. Because the second node 2 receives this message 11-4 before the hold time 21-3 has expired, the second node 2 considers the first link 5 remains intact.

Thus in this scenario, in which an embodiment of the invention has now been implemented, both the first node 1 and the second node 2 consider the first link to be intact, and will do so (assuming the first node's hello transmissions continue to be received by the second node 2) without any transmissions from the second node 2 being received at the first node 1, until the special hold time 22-s2 expires, i.e. after approximately 1 hour. This means that although the second node 2 will typically not transmit toward the first node 1 because of the threat 110, the first node may continue to transmit data to the second node 2 and treat it as an available route in the network 100. Thus the first link 5 has been made available as a unidirectional link (in the sense of it may still be desirable to transmit network traffic and control data from the first node 1 to the second node 2, even though that is not the case for the opposite direction of transmitting network traffic and control data from the second node 2 to the first node 1).

If after a certain period of non-transmission by the second node 2 it is determined that it is desired to return the first link 5 to routine bidirectional functionality, this may be carried out as follows. Referring to FIG. 5, let us consider that at a time $t_3$, being for example approximately 10 minutes after transmission had been ceased, the threat 110 is no longer relevant and messages may again be transmitted from the second node 2 that can be received by the first node 1. (There may be various different reasons the threat 110 is no longer considered relevant, for example the threat may have become inactive or the positions of the nodes, in particular the first node 1 and/or the second node 2 may have changed relative to that of the threat 110.)

In this example, in the 2 seconds preceding time $t_3$ the first node 1 transmits its 301st hello plus hold time message 11-301 which contains a refreshed hold time 21-301 and which is received by the second node 2. Because the second node 2 receives this message 11-301 before the currently applicable hold time (not shown) has expired, the second node 2 considers the first link 5 remains intact.

As part of resuming transmission, the second node 2 transmits its second hello plus hold time message 12-2 which contains a refreshed routine hold time 22-2 and which is received by the first node 1. In this embodiment the routine hold time 22-2 is of the same value as the other routine hold times (e.g. hold time 22-1) employed prior to the ceasing of transmission (i.e. here 4 seconds). However this need not be the case, and in other embodiments different values may be employed. The first node 1 replaces its currently active special hold time 22-s2 of 1 hour (of which approximately 50 minutes would have been remaining) with this new routine hold time 22-2 equal to 4 seconds.

The first node 1 transmits its 302nd hello plus hold time message 11-302 which contains a refreshed hold time 21-302 and which is received by the second node 2. Because the second node 2 receives this message 11-302 before the hold time 21-301 has expired, the second node 2 considers the first link 5 remains intact.

The second node 2 transmits its third hello plus hold time message 12-3 which contains a refreshed hold time 22-3 and which is received by the first node 1. Because the first node 1 receives this message 12-3 before the hold time 22-2 has expired, the first node 1 considers the first link 5 remains intact.

The first node 1 transmits its 303rd hello plus hold time message 11-303 which contains a refreshed hold time 21-303 and which is received by the second node 2. Because the second node 2 receives this message 11-303 before the hold time 21-302 has expired, the second node 2 considers the first link 5 remains intact.

The second node 2 transmits its fourth hello plus hold time message 12-4 which contains a refreshed hold time 22-4 and which is received by the first node 1. Because the first node 1 receives this message 12-4 before the hold time 22-3 has expired, the first node 1 considers the first link 5 remains intact.

The above process continues as described. It can be appreciated that the first link 2 has been returned to normal bidirectional functionality.

In the embodiment described above with reference to FIG. 5, the first link 5 has been made available as a unidirectional link during the temporary ceasing of transmission from the second node 2 to the first node 1. This advantageously allows traffic and/or control data to continue to be sent from the first node 1 to the second node 2. Additionally, this allows a further optional advantage that even if the threat 110 remains, the first link 5 may be used as a bidirectional link for sending traffic data, preferably for a short time only, for the purpose of transmitting high priority messages from the second node 2 to the first node 1, if for example it is deemed that that is of higher priority than maintaining an absolute bar on wireless transmissions from the second node 2 to the first node 1. (Traffic may be identified as high priority by any appropriate means, for example by marking data packets accordingly, using, for example, Differentiated Services Code Point (DCSP).) In the event high priority traffic is being transmitted in this way, routine hello and hold time messages should not be sent alongside the traffic data, as this would tend to break the above described process by which the link is being kept artificially alive (and which furthermore tends to provide yet another advantage, namely that by avoiding sending of control messages, a minimum of wireless transmission will need to be sent to transmit the traffic data, which will typically be desirable in view of the threat 110).

Another possibility is that both nodes of the link may desire to cease transmission but keep the link artificially alive. In this case both nodes can perform the relevant sending of special hello plus hold time messages and so on as was described above for the case of one node only. In this case, although those advantages relating to one node continuing to use the link as a unidirectional traffic data link will not apply, nevertheless those advantages tending to be provided by virtue of the link remaining available for transmission of high priority traffic data messages without the need for further control messages to be sent will tend to be provided.

The above discussed advantages are provided by the processes and messages described above. However, as a downside of achieving such advantages, certain further undesirable effects may occur. Optionally, in further embodiments, these further effects may be alleviated or removed by implementation of one or more of the following refinements.

Because the mechanism for providing a unidirectional link is based on extending the hold time, there is a possibility that during the extended hold time period, while the first node is treating the first link 5 as intact, it may in fact be the case that the second node 2 is not in reality anymore receiving transmissions being transmitted by the first node 1. This may become more likely the longer the special extended hold time remains the current applicable hold time. Accordingly, in order to alleviate or remove possible failures of messages being transmitted in ignorance of such a situation by the first node 1 for intended receipt at the second node 2, the first link 5 is given a reduced likelihood of selection as a suitable route for transmitting messages that nodes might otherwise have determined should be transmitted to or via the second node 2. In this embodiment this is implemented by the first link 5 being allocated a higher OLSRv2 link metric value than would otherwise be the case. Preferably the link metric value allocated is that defining the link to be one of last resort, i.e. it will only be used if no other routes are available. Under the OLSRv2 protocol the receiving node determines the link metric value and then informs the other nodes of the value. In this embodiment, before temporarily ceasing transmission, the second node 2 instructs the first node 1 to set the link metric value high. With OLSRv2 the link metric is in the hello plus hold time message, so in this embodiment no additional messages are needed to set the link metric value high. However, in other embodiments that are implemented with a protocol other than OLSRv2, it may be the case that separate additional messages are needed to set the link metric value high. This approach may however result in other nodes, in addition to the first node 1, setting their respective link metric values for the second node 2 high, even though this is not helpful. This may optionally be alleviated by the second node 2 later sending, only in directions other than the one in which transmission is being avoided, a new instruction for its link metric value to be set low again, thereby allowing some or all of the nodes other than the first node 1 to reset their value for the link metric value to the second node at the regular value. In other embodiments, any other appropriate mechanism may be used to allocate a higher OLSRv2 link metric value than would otherwise be the case to the first link 5. For example, physical protocol layer information may be used, e.g. which signals are received from which directions (e.g. which signals are received through which sectors of a sectored antenna), or some other source of information from the mission planner.

We now turn to a further undesirable effect that may occur when obtaining the main advantages of the above described first embodiment, which may be alleviated or removed by implementation of the following refinements.

Under the OLSRv2 protocol, and many other protocols for ad hoc networks, messages (that for convenience will be referred to herein as topology message) are regularly passed between nodes that inform the nodes about the topology of the ad hoc network. The topology information may include aspects such as link state information across the network or parts of the network, for example possible node existence and interconnectivity, the existence and interconnections to sub-networks, in particular local attached sub-networks, and other local attached networks, and other routing details. In the above described embodiments, topology updates provided by such topology messages are not received by the first node 1 from the second node 2 (i.e. are not passed on from the second node 2 to the first node 1) during the relatively long period of time (e.g. in the above embodiments potentially for up to 1 hour) that the second node 2 has ceased transmitting to the first node 1. Thus, as is the case under OLSRv2, if normally the first node 1 expects to receive topology messages every so often, e.g. every twelve seconds, then after twelve seconds due to the absence of receipt of any further topology messages from the second node 2, the first node 1 would assume all of the second node's onward connectivity was no longer available. Accordingly the first node 1 would only (possibly) transmit messages or other data to the second node 2 that were for the second node 2, rather than also (possibly) sending other messages and data to the second node for onward transmission to other nodes reachable via the second node 2. Optionally, in further embodiments, this disadvantage may be alleviated or removed by the second node 2 informing the first node 1, prior to ceasing transmission, of topology details relating to the second node's onward forwarding capabilities, and furthermore instructing the first node 1 to maintain this special topology information for a special extended time. The special extended time may be set equal to the relevant special hold time (e.g. special hold time 22-*s*2 in the above described embodiments), but this need not be the case in other embodiments. Preferably the special topology information is transmitted from the second node 2 to the first node 1 shortly before, after or between the transmission of the two special hello plus hold time messages 12-*s*1 and 12-*s*2.

Generally any suitable from of topology information may be determined and passed to the first node 1. However, various advantageous implementation details that may be employed in certain further embodiments are as follows.

In one implementation, the special topology messages are extended OLSRv2 topology control messages. The modified topology control messages advertise all possible destinations (using for example the all destinations IPv4 network address 0.0.0.0/0 or the all destinations IPv6 network address ::/0) as local attached sub-networks or networks. In one embodiment, although advertised as local attached sub-networks or networks, they are not put in the local routing table of the second node 2. Optionally, to alleviate or avoid any resulting disruption, the local attached sub-networks or networks may be allocated a revised higher link metric value, thereby enabling routing via the routes unaffected by the overall process to take precedence over routing via the local attached sub-networks or networks. One possibility is for the link metric value allocated to be a value defining the link to be one of last resort, i.e. it will only be used if no other routes are available. Following such advertisement, a router (node) unknowingly selecting an artificially maintained link with no alternative route to the partially disconnected part of the network will route remote traffic by that artificially maintained link, expecting the traffic destination to be the locally attached sub-network or network, because all other remote destination information will be lost, as no topology control messages will have reached the router, and other network information will have timed out. However, as no such sub-network or network is attached at the router (node) that sent that information, the traffic will then be properly routed by that router and the rest of the network.

In the above embodiments the various processes described are implemented in the OLSRv2 protocol layer of a protocol stack. In other embodiments the processes may be implemented in any suitable protocol layer. As the skilled person is well aware, many communications protocol stack configurations are available in the art, and the skilled person will adapt a suitable protocol layer as appropriate depending upon the required or desired protocol stack implementation. Generally speaking, it will also be readily within the capabilities of the skilled person to adapt any other layers of the protocol stack if required to accommodate changes made to the main layer in which he or she is implementing embodiments of the invention. Some examples of particular implementations that may be applied to lower protocol layers of such a protocol stack compared to the protocol layer in which the above processes are implemented include the following. When an address resolution protocol is employed, long storage times for pre-established translations may be configured. If lower protocol layers include bidirectional link operation, such handshakes may be turned off, or allowable response times significantly extended in a manner analogous or equivalent to the above described processes in the OLSRv2 protocol layer.

Figure 6:
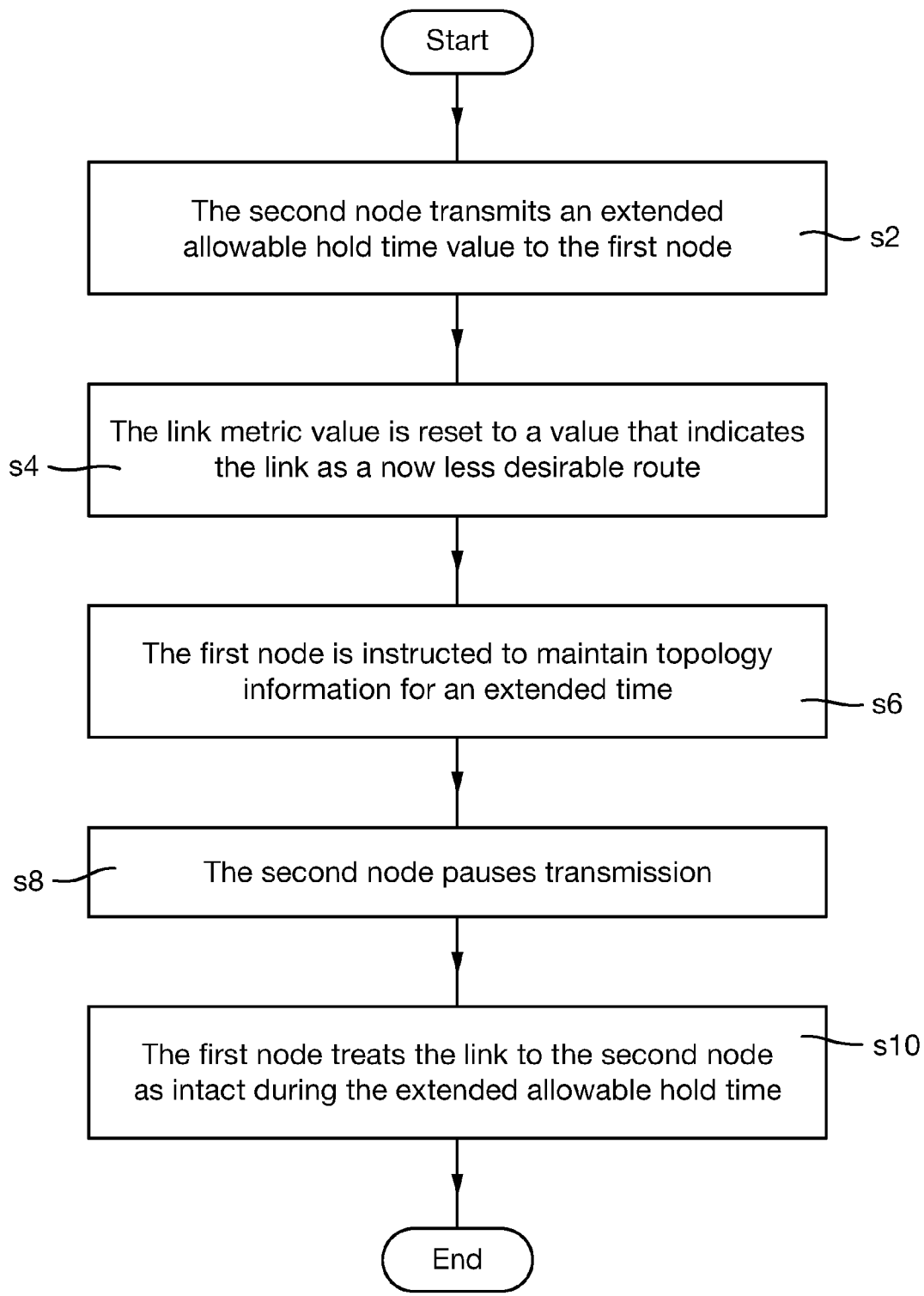
FIG. 6 is a process flowchart comprising certain steps of a process of operating an ad hoc network.

The above described embodiments may further be described and represented in terms of a process flowchart comprising certain steps of those embodiments of a process of operating an ad hoc network, as shown in FIG. 6.

Referring to FIG. 6, at step s2, the second node 2 transmits an extended allowable hold time value to the first node 1 (possibly two or more times.

At step s4, the link metric value is reset to a value that indicates the link as a now less desirable route (in this OLSRv2 embodiment, this is in fact done at the same time as step s2, since the link metric value is contained in the hello plus hold time message).

At step s6, the first node 1 is instructed to maintain topology information for an extended time.

At step s8, the second node 2 pauses transmission.

At step s10, the first node 1 treats the link to the second node 2 as intact during the extended allowable hold time.

It should be noted that certain of the process steps depicted in the flowchart of FIG. 6 and described above may be omitted or such process steps may be performed in differing order to that presented above and shown in FIG. 6. For example, as previously stated, either or both of the steps s4 and s6 may be omitted in the method of FIG. 6. Furthermore, although all the process steps have, for convenience and ease of understanding, been depicted as discrete temporally-sequential steps, nevertheless some of the process steps may in fact be performed simultaneously or at least overlapping to some extent temporally. For example, under OLSRv2 s2 and s4 are performed at the same time.

Apparatus, for implementing the above arrangements and processes as described with reference to FIGS. 1-6 may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

In the above embodiments, the second node 2 paused transmitting because of the presence of a threat 110. However, this need not be the cause, and in other embodiments transmission may be ceased or paused for any reason.

More generally, in the above embodiments, the second node 2 pausing transmission, at least in the direction of the first node 1, represented a way in which the second node 2 changed its transmission behaviour such that the first node 1 stopped receiving transmission from the second node 2 for an extended period, i.e. where the extended period was the period for which transmission was paused. However, in other embodiments, the second node 2 may change its transmission behaviour in other ways such that the first node 1 stops receiving transmission from the second node 2 for an extended period. For example, the second node 2 may reduce its transmission power for the extended period, at least for its transmissions in the direction of the first node 1. This would allow, for example, transmissions in that direction to still reach a node that was closer than the first node 1.

In the above embodiments, the special hold time was set at 1 hour. In other embodiments, the special hold time may be set at other durations. Furthermore, a set value may be used in a given system or for a given node, or alternatively dynamic values may be employed, for example different values may be specified at different times, or on different missions or other deployment variables, or may be varied according to dynamic network characteristics under control of an algorithm, or may be updated under an instruction received via the network, and so on.

In the above embodiments, the special hello plus hold time messages were sent in quick succession to each other and relatively soon after it was determined transmission was to cease, i.e. they were sent earlier than the next routine hello plus hold time message would have been sent had there not been a determination that transmission was to cease. However, this need not be the case, and in other embodiments a single or multiple special hello plus hold time messages may be sent according to the schedule under which routine hello plus hold time messages would have been sent anyway. This will be particularly convenient if it is known a relatively long time in advance that it will be intended to cease transmission in due course.

The above embodiments are implemented using the OLSRv2 protocol. In other embodiments other versions or adaptations of OLSR may be used. Yet further embodiments may be implemented under link state routing protocols other than OLSR, and yet further embodiments may be implemented under other types of proactive routing protocol. Generally, embodiments may be implemented under any suitable ad hoc network protocol in which a hello process, or other type of neighbour discovery and link symmetry recognition process, or other type of handshake process, is normally time limited at a relatively short duration by means of a hold time or validity time or other timeout formulation (including other terminologies employed to describe an equivalent concept) for an expected next hello or corresponding message, whose time limit duration may be extended for the purpose of keeping the link available as described above which were so described in relation to the specific hello messages and time-out implementations used in OLSRv2. Accordingly, any such types of hello/handshake/neighbour discovery message processes are to be considered as implementations of the term "hello message"

as used herein and in the appended claims, and any such types of hold time or validity time or other corresponding timeout parameter with associated time limits are to be considered as implementations of the term "hold time" as used herein and in the appended claims. For example, in the case of protocols with other types of handshake messages, either a handshake message sent from a first node to a second node indicating the presence of the first node, and/or an acknowledgment message (ACK) or a negative acknowledgment message (NACK) then sent back from the second node to the first node, may be used as the "hello message" whose hold time or validity time is significantly extended.

In the above embodiments, in order to set a link metric value as one that gives a reduced likelihood of selection as a suitable route for transmitting the messages compared to conventionally available links, the value is set higher than that of the conventionally available links, as in OLSRv2 protocol the higher the value of the metric link value, the less desirable is the link. In contrast, in embodiments where a protocol is employed in which lower values of metric link value indicate less desirability of the link, then of course, in order to set the link metric value to be one that gives a reduced likelihood of selection as a suitable route for transmitting the messages compared to conventionally available links, the link metric value will be set lower than that of the conventionally available links.

In the above embodiments the ad hoc network includes nodes which are UAVs. However, other embodiments may be implemented in other types of ad hoc network, including, but not limited to, networks where some or all of the nodes are other types of autonomous vehicle, networks where some or all of the nodes are manned vehicles, networks where some or all of the nodes are satellites, and networks where some or all of the nodes are people, e.g. soldiers or first responders, including any mixtures of the preceding node-type examples.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. A method in an ad hoc network comprising a plurality of nodes, the method comprising:
   i) a node transmitting a first neighbor discovery message, comprising a first allowable hold time value indicating how long other nodes should be prepared to wait for a further neighbor discovery message whilst still considering that a link to and from the node is intact, to a further node; and
   ii) the further node transmitting a second neighbor discovery message, comprising a second allowable hold time value indicating how long other nodes should be prepared to wait for a further neighbor discovery message whilst still considering that a link to and from the further node is intact, to the node;
   a bidirectional link between the node and the further node thereby being provided by the steps i) and ii);
   iii) the node transmitting a third neighbor discovery message, comprising a third allowable hold time value indicating how long other nodes should be prepared to wait for a further neighbor discovery message whilst still considering that a link to and from the node is intact, to the further node, the third allowable hold time being an extended allowable hold time compared to the first allowable hold time;
   iv) the further node transmitting a fourth neighbor discovery message, comprising a fourth allowable hold time value indicating how long other nodes should be prepared to wait for a further neighbor discovery message whilst still considering that a link to and from the further node is intact, to the node, the fourth allowable hold time value being the same as, or less than, the second allowable hold time;
   v) the node changing its transmission behavior such that the further node stops receiving transmission from the node for an extended period;
   a unidirectional link from the further node to the node thereby being provided by the steps iii), iv) and v); and
   further comprising the node being instructed to maintain topology information for an extended time,
   wherein the method is performed responsive to a threat located at a position relative to the positions of the node and the further node that means it is not desired to transmit in a direction from the node to the further node but it is desired or acceptable to transmit in a direction from the further node to the node.

2. The method according to claim 1, wherein the node changing its transmission behavior comprises the node pausing transmission at least in the direction of the further node.

3. The method according to claim 1, wherein the extended allowable hold time relates to timing receipt of future hello messages.

4. The method according to claim 1, wherein the transmitting of the extended allowable hold time value is performed earlier than a next routine transmission of routine allowable hold time value would have been sent.

5. A method according to claim 1, wherein the node is instructed to maintain topology information for an extended time by use of one or more special topology messages advertising all possible destinations as local attached subnetworks or networks.

6. A method according to claim 1, wherein a link metric value for the link between the node and the further node is reset to a new value that indicates the link as a now less desirable route.

7. A method according to claim 6, wherein the new link metric value is of a value that any overall routes that involve the link will be ones of last resort.

8. A method according to claim 6, wherein the new link metric value is higher than was the case before the value was reset.

9. A method according to claim 1, wherein the ad hoc network is operated under the OLSRv2 protocol.

10. A method according to claim 1, wherein some or all of the nodes are unmanned vehicles.

11. A method according to claim 10, wherein some or all of the nodes are unmanned air vehicles.

12. Apparatus for use in an ad hoc network, the ad hoc network comprising a plurality of nodes, the apparatus comprising:
- a node having a first transmitter arranged to transmit a first neighbor discovery message, comprising a first allowable hold time value indicating how long other nodes should be prepared to wait for a further neighbor discovery message whilst still considering that a link to and from the node is intact, to a further node; and
- a further node having a second transmitter arranged to transmit a second neighbor discovery message, comprising a second allowable hold time value indicating how long other nodes should be prepared to wait for a further neighbor discovery message whilst still considering that a link to and from the further node is intact, to the node;
- the first and second transmitters being for providing thereby a bidirectional link between the node and the further node;
- the first transmitter being arranged to transmit a third neighbor discovery message, comprising a third allowable hold time value indicating how long other nodes should be prepared to wait for a further neighbor discovery message whilst still considering that a link to and from the node is intact, to the further node, the third allowable hold time being an extended allowable hold time compared to the first allowable hold time;
- the second transmitter being arranged to transmit a fourth neighbor discovery message, comprising a fourth allowable hold time value indicating how long other nodes should be prepared to wait for a further neighbor discovery message whilst still considering that a link to and from the further node is intact, to the node, the fourth allowable hold time value being the same as, or less than, the second allowable hold time; and
- a processor arranged to, responsive to a threat located at a position relative to the positions of the node and the further node that means it is not desired to transmit in a direction from the node to the further node but it is desired or acceptable to transmit in a direction from the further node to the node, change the transmission behavior of the node such that the further node is stopped receiving transmission from the node for an extended period, the node being instructed to maintain topology information for an extended time;
- the first transmitter, second transmitter, and controller thereby providing a unidirectional link from the further node to the node.

* * * * *